United States Patent [19]

Kobashi et al.

[11] Patent Number: 5,005,107
[45] Date of Patent: Apr. 2, 1991

[54] SOLID ELECTROLYTIC CAPACITOR

[75] Inventors: Yasuhiro Kobashi, Yahata; Tsutomu Irikura, Joyo, both of Japan

[73] Assignee: Matsushita Electric Industrial Co., Ltd., Kadoma, Japan

[21] Appl. No.: 446,908

[22] Filed: Dec. 6, 1989

[30] Foreign Application Priority Data

| Dec. 7, 1988 | [JP] | Japan | 63-309487 |
| Apr. 5, 1989 | [JP] | Japan | 1-86240 |
| Apr. 5, 1989 | [JP] | Japan | 1-86241 |
| Apr. 5, 1989 | [JP] | Japan | 1-86242 |
| Apr. 5, 1989 | [JP] | Japan | 1-86265 |
| Apr. 5, 1989 | [JP] | Japan | 1-86266 |

[51] Int. Cl.$^5$ ............................................. H01G 9/00
[52] U.S. Cl. ...................................................... 361/540
[58] Field of Search ............... 361/525, 528, 539, 540, 361/523, 516, 526, 534; 427/229

[56] References Cited

U.S. PATENT DOCUMENTS

| 4,166,286 | 8/1979 | Boissonnault | 361/532 |
| 4,184,192 | 1/1980 | Yoshida et al. | 361/532 |
| 4,408,257 | 10/1983 | Walters | 361/516 |
| 4,758,929 | 7/1988 | Naitoh et al. | 361/526 |
| 4,763,228 | 8/1988 | Su | 361/534 |

FOREIGN PATENT DOCUMENTS

| 2806395 | 2/1978 | Fed. Rep. of Germany . |
| 1232714 | 9/1988 | Japan . |
| 63-296332 | 12/1988 | Japan . |
| 7415302 | 11/1974 | Netherlands . |

Primary Examiner—Donald A. Griffin
Attorney, Agent, or Firm—Danitch Schwarze Jacobs & Nadel

[57] ABSTRACT

A solid electrolytic capacitor of this invention comprises an electrode provided with an anode lead; a dielectric oxide film, a solid electrolyte layer, a carbon layer, and a cathode layer, which are successively formed on the surface of the electrode; a positive terminal connected to the anode lead; and a negative terminal connected to the cathode layer by means of an electrically conductive adhesive; wherein at least one of the cathode layer and the electrically conductive adhesive comprises a polymer and an electrically conductive powder containing palladium. The capacitor displays little variation in the value of tan δ and slight changes in current leakage even when the capacitor is placed under conditions of high temperature and humidity. Moreover, electrical short-circuit failure of the capacitor rarely occurs.

13 Claims, 7 Drawing Sheets

SOLID ELECTROLYTIC CAPACITOR

BACKGROUND OF THE INVENTION

1. Field of the invention:

The present invention relates to a solid electrolytic capacitor.

Figure 1:
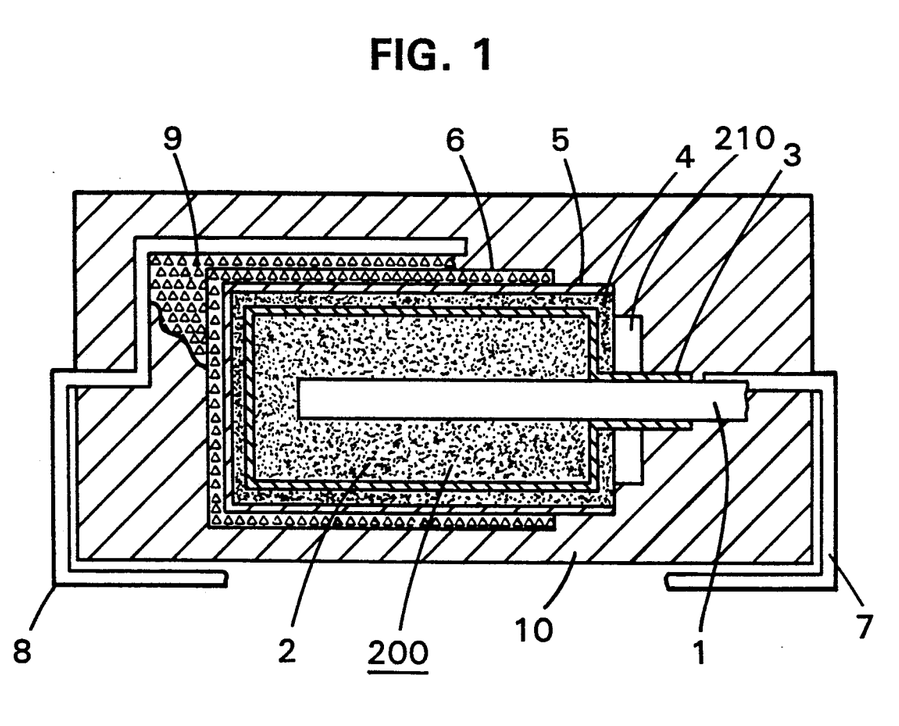
FIG. 1 is a longitudinal sectional view showing the structure of a conventional chip type solid electrolytic capacitor.

2. Description of the prior art:

Solid electrolytic capacitors ordinarily possess the structure shown in FIG. 1. This solid electrolytic capacitor is composed of an electrode 2 provided with an anode lead 1; a dielectric oxide film 3, a solid electrolyte layer 4, a carbon layer 5, and a cathode layer 6, which are successively formed on the surface of the electrode 2; a positive terminal 7 connected to the anode lead 1; and a negative terminal 8 connected to the cathode layer 6 by means of an electrically conductive adhesive 9.

A capacitor of this type can be manufactured, for example, in the following manner. First, the insulating plate 210 is attached to the root portion of the tantalum anode lead 1 of the porous tantalum electrode 2, and then the tantalum oxide dielectric film 3 is formed by anodic oxidation on the surface of the porous tantalum electrode 2. Next, the solid electrolyte layer 4, made of manganese dioxide, and the carbon layer 5 are successively formed on the surface of this tantalum oxide dielectric film 3. Then, an electrically conductive coating material containing silver, copper, nickel or carbon powder, etc., a polymer, and an organic solvent is applied and dried to form the cathode layer 6, thus obtaining the capacitor element 200. Next, the tantalum anode lead 1 of this capacitor element 200 is connected by welding to the positive terminal 7, and then, either by soldering or by application of an electrically conductive adhesive 9 containing silver, copper, nickel or carbon powder, etc., a polymer and an organic solvent, followed by drying, the cathode layer 6 is connected to the negative terminal 8. Next, the capacitor element 200 is covered with plastic 10 by the molding method in such a manner that the positive terminal 7 and negative terminal 8 extend in opposite directions to each other. As is required, the terminals 7 and 8 of the capacitor, which extend in opposite directions, are bent toward the inside in a downward direction relative to the body of the capacitor so as to conform with the end and bottom faces of the capacitor.

In the aforementioned conventional type of solid electrolytic capacitor, if either the cathode layer 6 or electrically conductive adhesive 9 are composed of silver powder and a polymer, then migration of silver occurs when the said capacitor is placed under conditions of high temperature and humidity, resulting in short-circuit failures and large current leakage.

On the other hand, if the cathode layer 6 and electrically conductive adhesive 9 are composed of copper powder and a polymer, or composed of nickel powder and a polymer, then, the said copper or nickel does not migrate, as does silver, even under conditions of high temperature and humidity. However, since copper and nickel powder are easily oxidized, the value of tan $\delta$ increases at high temperatures and high humidity.

If the cathode layer 6 and electrically conductive adhesive 9 are composed of carbon powder and polymer, then migration, as occurs in the case of silver, does not occur even under conditions of high temperature and humidity. However, because the specific resistance of carbon powder is large as compared with that of the aforementioned metal powders, the initial value of tan $\delta$ is extremely large.

SUMMARY OF THE INVENTION

The solid electrolytic capacitor of this invention, which overcomes the above-discussed and numerous other disadvantages and deficiencies of the prior art, comprises an electrode provided with an anode lead; a dielectric oxide film, a solid electrolyte layer, a carbon layer, and a cathode layer, which are successively formed on the surface of the electrode; a positive terminal connected to the anode lead; and a negative terminal connected to the cathode layer by means of an electrically conductive adhesive; wherein at least one of the cathode layer and the electrically conductive adhesive comprises a polymer and an electrically conductive powder containing palladium.

In a preferred embodiment, the electrically conductive powder is a flaky palladium powder with grain diameters of 1-30 $\mu$m.

In another preferred embodiment, the electrically conductive powder is a palladium-coated metal powder obtained by forming a coating layer of palladium 0.1-2 $\mu$m in thickness on the surface of each granule of an electrically conductive flaky powder which is composed of a metal with higher electrical conductivity than that of palladium, the granule having a diameter of 1-50 $\mu$m.

In another preferred embodiment, the electrically conductive powder is a palladium-coated graphite powder obtained by forming a coating layer of palladium 0.1-0.2 $\mu$m in thickness on the surface of each granule of flaky graphite powder with grain diameters of 1-50 $\mu$m.

In another preferred embodiment, the electrically conductive powder is a mixture of palladium powder and a graphite powder.

In another preferred embodiment, the electrically conductive powder is a mixture of palladium powder and a palladium-coated graphite powder obtained by forming a coating layer of palladium on the surface of each granule of graphite powder.

Thus, the invention described herein makes possible the objectives of: (1) providing a solid electrolytic capacitor in which the initial value of tan $\delta$ is small, and the value does not change even when the said capacitor is placed under conditions of high temperature and humidity; and (2) providing a solid electrolytic capacitor which is extremely insusceptible to short-circuit failures and is subject to very little change in current leakage.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Preferred embodiments of this invention will be described below in detail with reference to the drawings.

Figure 2:
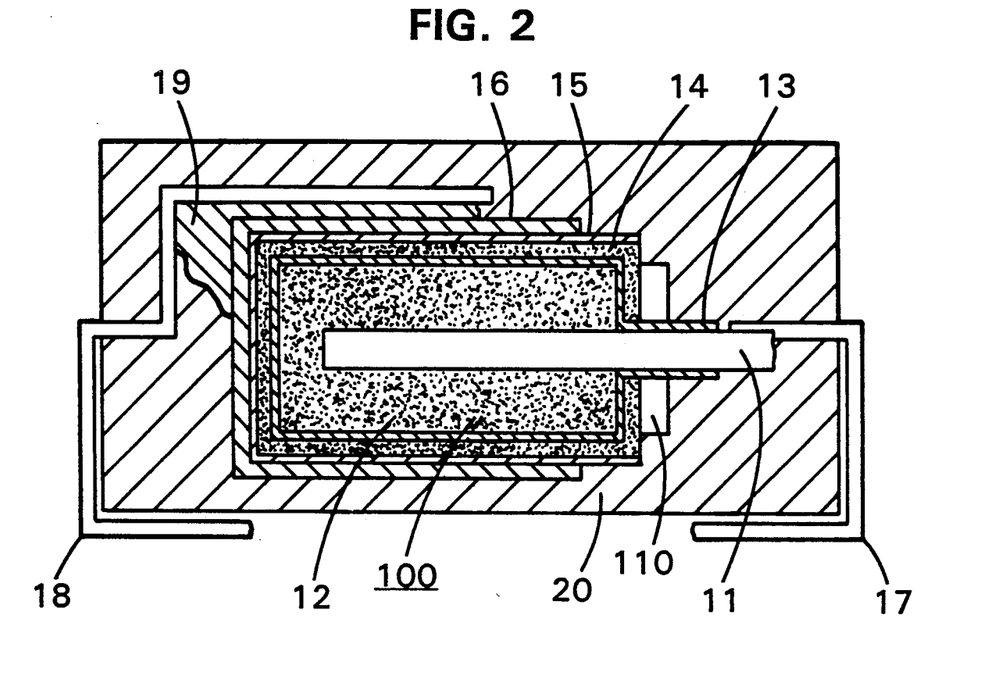
FIG. 2 is a longitudinal sectional view showing the structure of a chip type solid electrolytic capacitor of the present invention.

FIG. 2 is a longitudinal sectional view showing a solid electrolytic capacitor of this invention. This capacitor comprises an electrode provided with an anode lead; a dielectric oxide film, a solid electrolyte layer, a carbon layer, and a cathode layer, which are successively formed on the surface of the electrode; a positive terminal connected to the anode lead; and a negative terminal connected to the cathode layer by means of an electrically conductive adhesive. The structure of this capacitor is identical with that of the conventional solid electrolytic capacitor shown in FIG. 1, however, the materials constituting the cathode layer 16 (corresponding to reference numeral 6 in FIG. 1) and the electrically conductive adhesive 19 (corresponding to reference numeral 9 in FIG. 1) are different. The following will describe the preferred embodiments 1-5.

The first embodiment of the present solid electrolytic capacitor can be produced, for example, in the following manner. First, 100 mg of tantalum powder is placed in a cylindrical container, and then a tantalum wire of circular cross-section and diameter of 0.3 mm is buried along the axis of the tantalum powder mass. This tantalum wire serves as the tantalum anode lead 11. This powder mass is sintered by a conventional method, thereby forming the porous tantalum electrode 12 for use at 35 V and a capacitance of 6.8 $\mu$F. Next, this electrode is removed from the cylindrical container and the insulating plate 110 is mounted on the root portion of the tantalum anode lead 11, after which the tantalum oxide dielectric film 13 is formed and then the solid electrolyte layer 14 made of manganese dioxide is formed so as to cover the electrode 12. The carbon layer 15 is then formed so as to cover the solid electrolyte layer 14, except for the end face thereof where the anode lead protrudes. Separately, flaky palladium powder with grain diameter 5 $\mu$m, methyl methacrylate resin, and xylene as a solvent are mixed together in the weight ratio of 8.5:1.5:3.0 and the mixture is kneaded with a three-roll kneader to prepare the electrically conductive coating material for the cathode layer 16. Also, flaky palladium powder with grain diameter 5 $\mu$m, bisphenol epoxy resin, a phenolic curing agent, imidazole, and butyl cellosolve are kneaded together in the weight ratio of 85:9.1:5.9:0.1:15 to prepare the electrically conductive coating material for the electrically conductive adhesive 19.

Next, the electrically conductive coating material for the cathode layer 16 is coated by the dipping method onto the surface of the carbon layer 15, except for the portion where the anode lead protrudes. Then, after standing for 30 minutes at room temperature, the coating is dried at 120° C. for 1 hour to form the palladium cathode layer 16, thus obtaining the capacitor element 100. On the other hand, the electrically conductive coating material previously prepared in order to form the electrically conductive adhesive 19 is applied to the negative terminal 18 by means of a dispenser. The positive terminal 17 is then welded to the end of the anode lead 11. Next, the negative terminal 18 coated with the adhesive 19 is mounted on the peripheral surface of the capacitor element 100 in such a manner that the negative terminal 18 protrudes in the direction opposite to the positive terminal 17. Then, the tantalum anode lead 11 and the positive terminal 17 are connected by welding, after which the assembly is dried for 1 hour at 180° C. while applying slight pressure to ensure that the cathode layer 16 of the capacitor element 100 is securely connected to the negative terminal 18 via the electrically conductive adhesive 19. Next, the assembly is set into a transfer mold and the plastic 20 is applied in such a manner that the positive terminal 17 and the negative terminal 18 extend in opposite directions to each other. Then, the terminals 17 and 18 are bent toward the inside in a downward direction relative to the body of the capacitor so as to conform with the end and bottom faces of the capacitor.

In the solid electrolytic capacitor constructed in the above manner, the resistance can be used in place of the tan$\delta$. Therefore, the form and grain size of the electrically conductive powder used in the preparation of the electrically conductive coating material for the formation of the cathode layer 16 and electrically conductive adhesive 19 as well as the weight ratio of the said electrically conductive powder and the polymer, etc., were determined by evaluating the resistance of coatings formed from the said coating materials.

The flaky palladium granules and methyl methacrylate resin used in the cathode layer and electrically conductive adhesive of the aforementioned capacitor were mixed in predetermined proportions, xylene was added, and this mixture was kneaded into the form of a coating material which was applied at a thickness of 200 $\mu$m to a 1 cm$^2$ area on a glass base plate and dried at 120° C. for 30 minutes. Then, the electrical resistance of this coating was measured. The mixing ratio of the aforementioned flaky palladium granules and methyl methacrylate resin was varied, and the electrical resistances of the corresponding coatings were measured, with the results shown by curve A in FIG. 3. On the other hand, a powder composed of spherical palladium granules with mean diameter of 5 $\mu$m was used in place of the flaky palladium granules, and resistance measurements were performed in the same manner, with the results shown by curve D in FIG. 3. The data in FIG. 3 clearly show that the aforementioned electrically conductive powder can appropriately be used for an anode material when the weight ratio of palladium powder to methyl methacrylate resin is in the range of 9.5:0.5 to 6.0:4.0. However, in this case, if the amount of palladium powder is too large, then adhesive strength is decreased. Thus, careful attention is required to determine the amount of palladium powder. As regards the form of the palladium powder, the data show that flaky granules are preferable to spherical granules.

Next, in the same manner as described above, a coating material was formed by mixing flaky palladium powder with grain diameter 0.1 $\mu$m, methyl methacrylate resin and xylene at a weight ratio of 8.5:1.5:3.0. This coating material was applied to a glass base plate and dried at 120° C. for 30 minutes, resulting in a coating with an area of 1 cm$^2$ and a thickness of 200 $\mu$m. Then, the electrical resistance of this coating was measured. The grain size of the aforementioned flaky palladium powder was varied, and the electrical resistances of the corresponding coatings were measured, with the results shown by curve A in FIG. 4. The data in FIG. 4 indicate that when flaky palladium powder is used as the electrically conductive powder, the electrical resistance does not change to a great extent even if the grain size becomes quite large. However, in order to obtain a coating material containing the electrically conductive powder dispersed homogeneously therein, the grain diameter should desirably be within the range of 1 to 30 $\mu$m. Although methyl methacrylate resin was employed as the resin component in the above-mentioned measurements, similar results were also obtained when the thermoplastic and thermosetting resins described below were used.

Although acrylic resins were used as the resin component in the aforementioned cathode layer 16, other resins which have no adverse effects upon capacitor characteristics may also be utilized for this purpose. The resins include thermoplastic resins such as polyethylene, vinyl resins, cellulose resins, polycarbonate, polyamide resins, etc., as well as thermosetting resins such as epoxy resins, phenol resins, polyimide resins. These resins differ in thermal resistance, hygroscopicity, curability and strength of coatings formed by the resin, and must therefore be selected according to the intended applications of the capacitor. However, when a thermosetting resin is used, then particular attention must be given to the possibility that the value of tan $\delta$ may become large if the capacitor is placed in a high-humidity environment. In the example described above, an epoxy resin is used as the polymer (resin) component of the electrically conductive adhesive 19, however, other thermosetting resins could be utilized, provided that the resins have no adverse effects upon the capacitor characteristics. The resins include phenol resin and polyimide resins. Resins for use in the electrically conductive adhesive should particularly be selected for superior coating strength and good adhesion to metal. However, since the properties such as thermal resistance, hygroscopicity and curability of the resins are different from each other, the selection of the resin should be performed on the basis of the purpose for which the capacitor is used.

The flaky palladium powder used in the aforementioned first embodiment of the present invention is relatively inexpensive as compared with other precious metals, and possesses high electrical conductivity as compared with other metals. Furthermore, the palladium powder is chemically stable so that this material is relatively insusceptible to migration at high temperature and humidity. Since the type of solid electrolytic capacitor represented by the first embodiment of the present invention incorporates a cathode layer 16 and an electrically conductive adhesive 19, both containing palladium powder, although the initial value of tan $\delta$ is somewhat great, the changes in this value are small even if the capacitor is placed under conditions of high temperature and humidity, and current leakage of the capacitor is small.

In the second embodiment of the present invention, the electrically conductive powder contained in the aforementioned cathode layer and/or electrically conductive adhesive is a palladium-coated metal powder obtained by forming a coating layer of palladium on the surface of each granule of an electrically conductive powder which is composed of a metal with higher electrical conductivity than that of palladium. For example, this electrically conductive powder is a flaky or spherical granular nickel powder of grain diameter 4 $\mu$m having a coating layer of palladium 1 $\mu$m in thickness.

The solid electrolytic capacitor of the second embodiment is produced, by the same procedure as in the first embodiment using the aforementioned electrically conductive powder. Also, using the aforementioned flaky and spherical granular palladium-coated nickel powder, the mixing ratio of the powder and the resin component was varied and resistances of the corresponding coatings were measured in accordance with the same procedure as in the first embodiment. The results of these experiments are shown by curves B and E, respectively, in FIG. 3. These curves show that in the case of the aforementioned palladium-coated nickel powder, the weight ratios of palladium-coated nickel powder and methyl methacrylate resin which can appropriately be used in preparing the cathode material also range from 9.5:0.5 to 6.0:4:0, and that flaky powder is preferable to spherical granular powder.

Next, as was done in the first embodiment, the grain size of the aforementioned electrically conductive powder (palladium-coated flaky nickel powder) was varied, and the electrical resistances of the corresponding coatings were measured. The results are shown by curve B in FIG. 4. This curve shows that the electrical resistance of the coating does not change greatly even if the grain diameter of the electrically conductive powder is large. However, in order to obtain a coating material containing the electrically conductive powder dispersed homogeneously therein at a low cost, the grain size should preferably be in the range of 1 to 50 $\mu$m.

Figure 5:
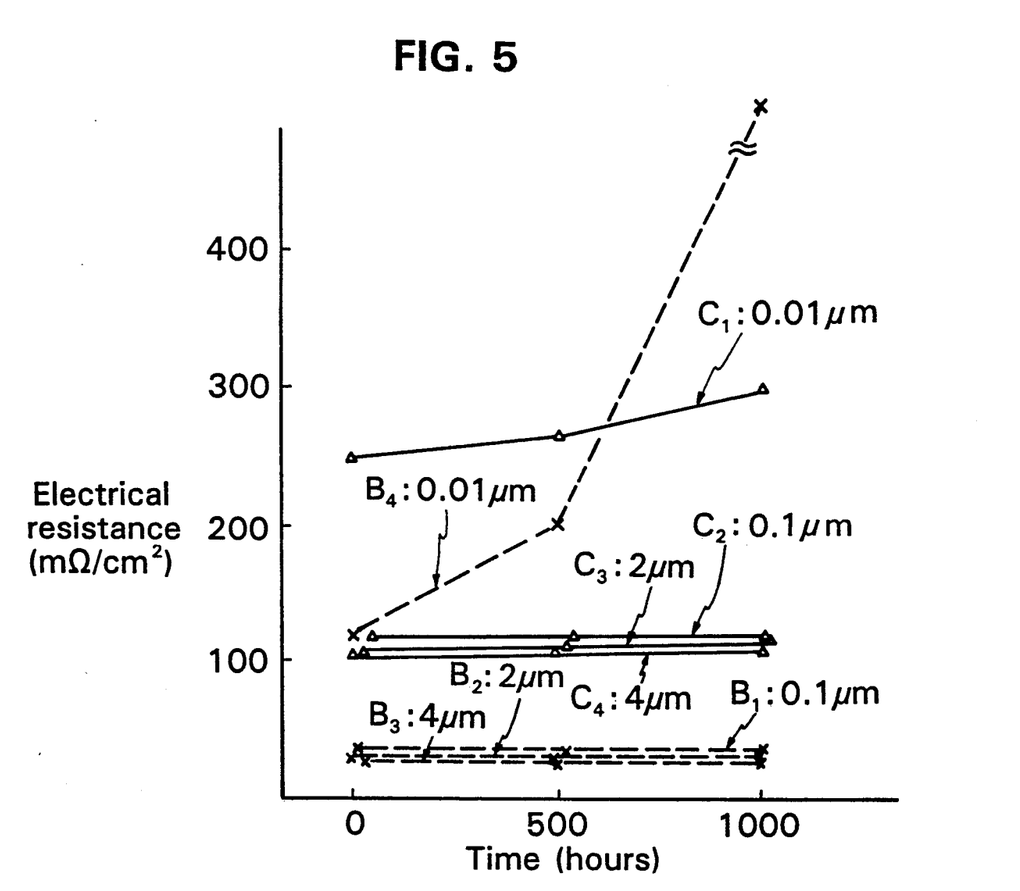
FIG. 5 shows graphs showing the results of the moisture resistance test for coatings containing electrically conductive powder granules coated with various thickness of palladium.

Next, in accordance with the following procedure, the thickness of the palladium coating on the granules of the aforementioned palladium-coated flaky nickel powder was varied as indicated by curves $B_1$ to $B_4$ in FIG. 5, and the moisture resistance of the corresponding coatings were measured. First, the electrically conductive powder, methyl methacrylate resin and xylene were mixed in the weight ratio of 8.5:1.5:3.0. This mixture was coated onto a printed circuit board to form a coating in thickness of 200 $\mu$m, which was then dried at 120° C. Next, the initial resistance (corresponding to the initial value of tan $\delta$) was measured. The coating on the printed circuit board was left in an atmosphere at relative humidity of 90% and temperature of 85° C., and the electrical resistance was measured after 500 hours and after 1000 hours. The results of these tests are shown by curves $B_1$–$B_4$ in FIG. 5. As seen from this figure, if the palladium coating is relatively thin, then the initial value of the electrical resistance (i.e., initial value of tan $\delta$) is large, moreover, if the coating is left under conditions of high temperature and humidity, then the said electrical resistance rises considerably. On the contrary, if the palladium coating is relatively thick, then the initial electrical resistance is small, and moreover, the electrical resistance does not increase even if the coating is left under conditions of high temperature and humidity. If the cost is also taken into consideration, then the most desirable thickness of the palladium coating is 0.1 to 2 $\mu$m. Although a methyl methacrylate resin was used in the aforementioned moisture resistance tests, similar results were obtained when the other varieties of thermoplastic and thermosetting resins listed in the first embodiment were employed.

As mentioned above, the electrically conductive powder in the present case is a palladium-coated nickel powder. As compared with other metals, palladium has high electrical conductivity, is chemically stable and is relatively insusceptible to ionization under conditions of high temperature and humidity. Therefore little migration occurs in capacitors wherein this material is employed, even if the capacitors are stored under conditions of high temperature and humidity. Moreover, since palladium is also one of the least expensive precious metals, the use of palladium for the present purpose permits the production of relatively inexpensive solid electrolytic capacitors.

In the aforementioned example, nickel is used as a metal with higher electrical conductivity than palladium. However, alternative metals can be used for this purpose. The metals include gold, silver, copper, iron, cadmium, aluminum, zinc and magnesium. The aforementioned metallic powder which forms the nuclei for the palladium-coated electrically conductive powder should be selected upon consideration of cost and characteristics with respect to high temperatures and high humidity as well as the applicability of palladium coatings to the surface of the granules of the said metallic powder.

Since a palladium-coated metallic powder is contained in the cathode layer 16 and the electrically conductive adhesive 19 in the capacitor so constructed in the second embodiment of the present invention, the initial value of tan $\delta$ is small. Moreover, changes in the value of tan $\delta$ are very small and current leakage is low.

In the third embodiment of the present invention, the electrically conductive powder contained in the aforementioned cathode layer and/or the electrically conductive adhesive is composed of graphite powder particles coated with palladium. For example, this electrically conductive powder is a palladium-coated graphite powder obtained by forming a coating layer of palladium 1 $\mu$m in thickness on the surface of each granule of flaky graphite powder with grain diameter of 4 $\mu$m.

The solid electrolytic capacitor of the third embodiment is produced, by the same procedure as in the first embodiment using the aforementioned electrically conductive powder. For example, using the aforementioned flaky electrically conductive powder, the electrically conductive coating material for the cathode layer is prepared by the method described below. Further, the coating material for the electrically conductive adhesive is prepared using the palladium-coated flaky nickel powder employed in the aforementioned second embodiment. Using these materials, a capacitor is produced by the above procedure. The aforementioned electrically conductive coating material for forming the cathode layer is obtained by mixing the aforementioned palladium-coated flaky graphite powder, methyl methacrylate resin and xylene in the weight ratio of 8.0:2.0:3.0. The aforementioned coating material for electrically conductive adhesive layer is obtained by mixing palladium-coated flaky nickel powder (i.e., flaky nickel powder with grain diameter of 4 $\mu$m coated with palladium 1 $\mu$m in thickness), bisphenol epoxy resin, a phenolic curing agent, imidazole and butyl cellosolve in the weight ratio of 8.0:12.1:7.9:20.

Using the aforementioned palladium-coated flaky and spherical granular graphite powder, experiments were conducted by varying the mixing ratio of this powder and the resin component and measuring the electrical resistance of the corresponding coatings in accordance with the same procedure as in the experiments performed in the first embodiment. The results so obtained are shown by curves C and E, respectively, in FIG. 3. These curves show that in the case of the aforementioned palladium-coated graphite powder, the weight ratios of this powder and the methyl methacrylate resin which are appropriate for use in preparation of the cathode material in the capacitor range from 9.5:0.5 to 6.0:4.0, and flaky powder is preferable to powder with spherical granules. However, the electrical resistances of coatings with such powders are slightly higher than coatings in which powdered palladium is used as the electrically conductive powder.

Next, as in the experiments performed in the first embodiment, the grain size of the aforementioned electrically conductive powder (palladium-coated flaky graphite powder) was varied and the electrical resistance of the corresponding coatings was measured. The results are shown by curve C in FIG. 4. This curve shows that the electrical resistance of the coating does not change greatly even if the grain diameter of the electrically conductive powder is large. However, in order to obtain a coating material containing the electrically conductive powder dispersed homogeneously therein at a low cost, the grain size should preferably be in the range of 1 to 50 $\mu$m.

Next, as in the experiments performed in the second embodiment, the thickness of the palladium coating of the powder granules was varied as indicated by curves $C_1$-$C_4$ of FIG. 5, and the moisture resistance of the corresponding coatings were evaluated. The results shown by these curves demonstrate that if the palladium coating on the granules is thin, then the initial electrical resistance (i.e., initial value of tan$\delta$) is large, but the electrical resistance does not increase largely even if the coating is left under conditions of high temperature and humidity. As the palladium coating on the granules increases in thickness, the initial electrical resistance decreases, furthermore, the electrical resistance does not rise substantially even if the coating is placed in conditions of high temperature and humidity. On the basis of cost considerations, the thickness of the coating should preferably be in the range of 0.1 to 2 $\mu$m.

Although a methyl methacrylate resin was used in the aforementioned moisture resistance tests, similar results were obtained when the other varieties of thermoplastic and thermosetting resins listed in the first embodiment were employed.

As stated above, the electrically conductive powder used in the present embodiment is palladium-coated graphite powder. As compared with other metals, palladium has a high electrical conductivity, is chemically stable and is relatively insusceptible to ionization even under conditions of high temperature and humidity.

The electrical conductivity of graphite powder is improved by coating the graphite granules with palladium. In capacitors wherein this type of electrically conductive powder is used, migration does not occur substantially even when the capacitor is placed in conditions of high temperature and humidity. Moreover, palladium is relatively inexpensive as compared with other precious metals, and therefore the capacitors can be provided economically.

The initial value of tan $\delta$ for the present type of capacitor is somewhat larger than those of the capacitors of the first and second embodiments, but the value does not increase greatly even if the capacitor is placed under conditions of high temperature and humidity. Moreover, the current leakage of the present type of capacitor is extremely small.

In the fourth embodiment of the present invention, the electrically conductive powder contained in the aforementioned cathode layer and/or the electrically conductive adhesive is a mixture of palladium powder and graphite powder.

The solid electrolytic capacitor of the fourth embodiment is produced, by the same procedure as in the first embodiment using the aforementioned electrically conductive powder. As the electrically conductive powder, for example, a mixture of flaky palladium powder with grain diameter of 5 $\mu$m and flaky graphite powder with grain diameter of 20 $\mu$m in the weight ratio 1:1 can be used. For example, a capacitor of the present invention can be produced using an electrically conductive coating material for cathode formation and a coating material for formation of the electrically conductive adhesive prepared as follows. That is, the aforementioned electrically conductive coating material for the formation of the cathode is obtained by mixing the aforementioned electrically conductive powder with methyl methacrylate resin and xylene in the weight ratio of 7:3:10, while the aforementioned coating material for the electrically conductive adhesive is prepared by mixing the aforementioned electrically conductive powder with bisphenol epoxy resin, a phenolic curing agent, imidazole and butyl cellosolve in the weight ratio of 80:12.2:7.6:0.25:40.

Figure 3:
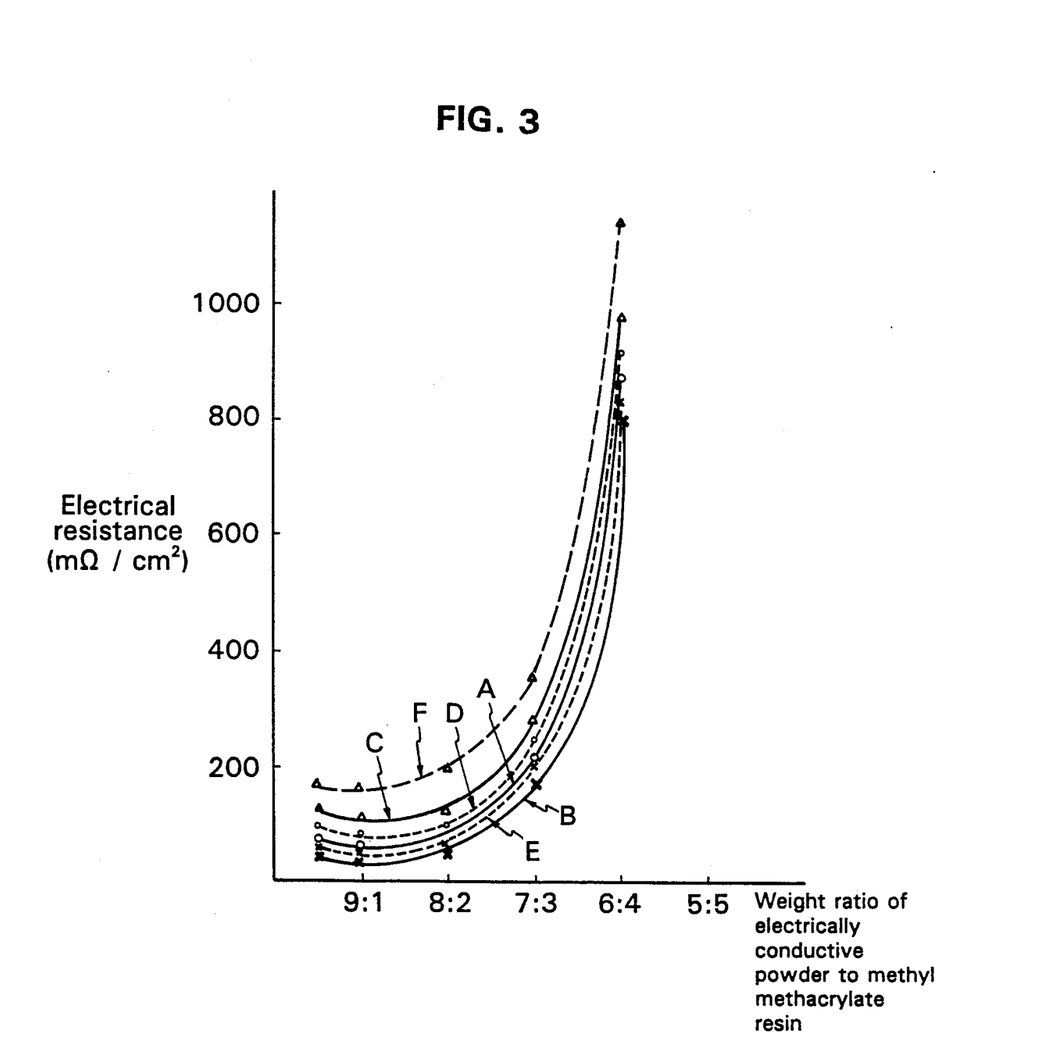
FIG. 3 shows the characteristic curves showing the relation between the weight ratios of the various electrically conductive powders (of granular or flake form) and polymers that are contained in conductive coating materials, and the electrical resistance of coatings formed from the said coating materials.
Figure 4:
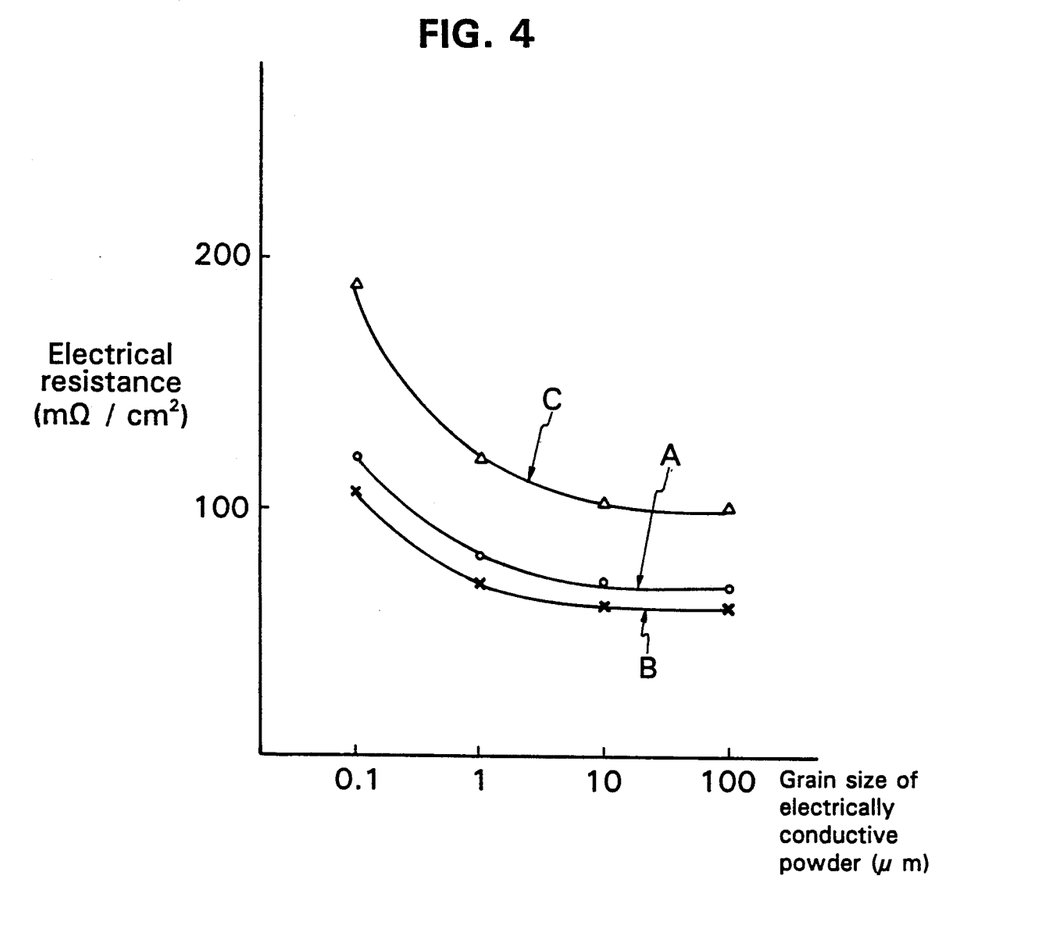
FIG. 4 shows the characteristic curves showing the relations between the grain size of various electrically conductive powders and the electrical resistance of coatings formed from coating materials containing the said powders.

On the basis of the data shown in FIGS. 3 and 4, the palladium powder component of the electrically conductive powder used in the capacitor of the fourth embodiment should also have a grain diameter in the range of 1 to 30 $\mu$m, and the form of the powder grains should also preferably be flaky. Moreover, graphite powder with flaky grains is also preferable.

Figure 6:
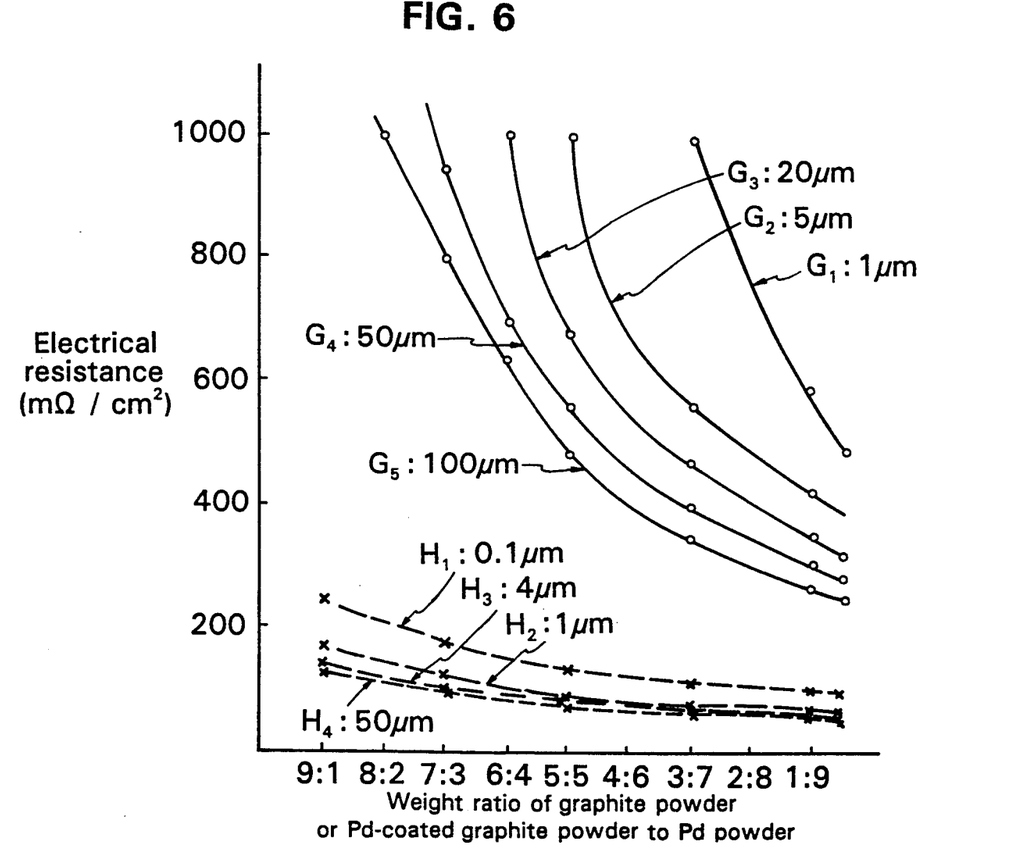
FIG. 6 shows graphs showing the relation between the mixing ratio in an electrically conductive powder and the electrical resistance of a coating containing the electrically conductive powder, wherein the electrically conductive powder is a mixture of graphite powder and palladium powder (indicated by a letter G) or a mixture of palladium-coated graphite powder and palladium powder (indicated by a letter H).

The mixing ratio of the palladium and graphite powders in the aforementioned mixture was varied as shown in FIG. 6. Then, by the same procedures as were used for the experiments performed in the first embodiment, coatings were formed from these mixtures and the electrical resistances of these coatings were measured. The coating materials used for the preparation of these coatings were obtained by mixing the aforementioned electrically conductive powder (i.e., powder mixture) with methyl methacrylate resin and xylene in the weight ratio of 7:3:10. The thickness of the coatings after drying was 200 $\mu$m. The grain diameter of the aforementioned palladium powder was 5 $\mu$m. As the graphite powder component, five varieties of powder with grain diameter ranging from 1 to 100 $\mu$m were selected, and five kinds of electrically conductive coating materials were obtained. The electrical resistance was measured for each of the coatings obtained from the above-mentioned coating materials. The results of these measurements are shown by curves $G_1$–$G_5$ in FIG. 6. The data in these curves shows that the electrical resistance of the coating decreases as the grain size of the flaky graphite powder increases. However, taking the surface characteristics of the coating into account, the grain diameter should desirably not exceed 100 $\mu$m. As regards the mixing ratio of the palladium and graphite powders, considering both the cost and the electrical resistance of the coatings so obtained, a weight ratio in the range of 9.5:0.5 to 2.5:7.5 is preferable.

Figure 7:
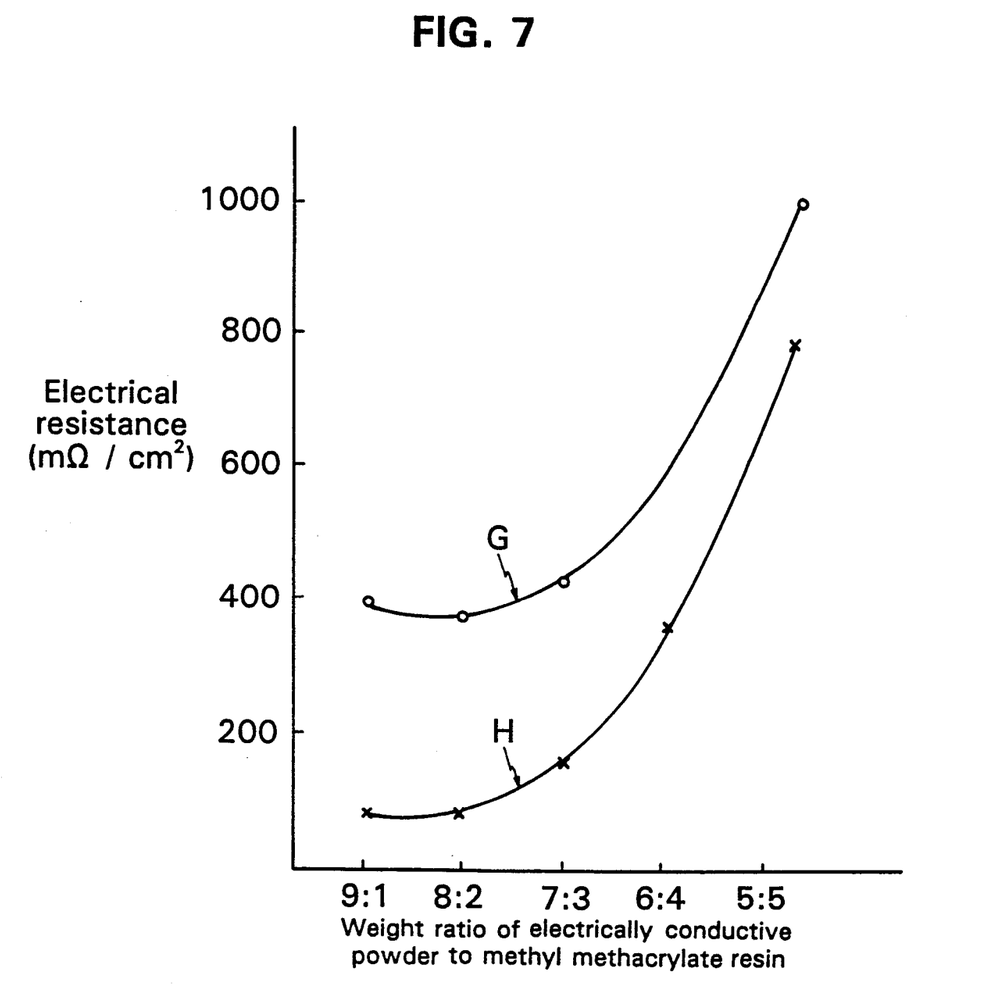
FIG. 7 shows graphs showing the relations between the weight ratios of palladium powder and graphite powder, or palladium powder and palladium coated graphite powder that are contained in conductive coating materials, and the electrical resistance of coatings containing the said mixtures.

Using a mixture of the aforementioned palladium powder and flaky graphite powder in the weight ratio of 1:1 as the electrically conductive powder, the mixing ratio of this powder and the resin component were varied, coatings were prepared in each case, and the electrical resistances of these coatings were measured by the same methods as were used in the experiments performed in the first embodiment. The results of the experiments are shown by curve $G_5$ in FIG. 7. This curve shows that in the case of the aforementioned electrically conductive powder (the powder mixture), the weight ratios of this powder and methyl methacrylate resin which can appropriately be used in preparing the cathode material in the capacitor range from 9.5:0.5 to 5.0:5.0.

Although a methyl methacrylate resin was used in the aforementioned moisture resistance tests, similar results were obtained when the other varieties of thermoplastic and thermosetting resins listed in the first embodiment were employed.

The palladium powder used as a component of the electrically conductive powder in the fourth embodiment of the present invention possesses high electrical conductivity as compared with other metals, as well as being chemically stable and relatively insusceptible to ionization in conditions of high temperature and humidity. Graphite powder possesses slightly lower electrical conductivity than palladium, but is insusceptible to ionization in conditions of high temperature and humidity. Consequently, the mixtures of these powders possess good electrical conductivity, and moreover, the capacitors obtained using the mixtures are insusceptible to migration under conditions of high temperature and humidity. Furthermore, since palladium is relatively inexpensive as compared with other precious metals, capacitors can be economically produced.

As compared with the capacitors of the aforementioned first and second embodiments, the present type of capacitor displays a slightly larger initial value of tan$\delta$, but this value does not greatly increase even if the capacitor is kept under conditions of high temperature and humidity. Moreover, the current leakage of the present type of capacitor is extremely low.

In the fifth embodiment of the present invention, the electrically conductive powder contained in the aforementioned cathode layer and/or the electrically conductive adhesive is a mixture of palladium powder and palladium-coated graphite powder.

The solid electrolytic capacitor of the fifth embodiment is produced, by the same procedure as in the first embodiment using the aforementioned electrically conductive powder. As the electrically conductive powder, for example, a mixture of flaky palladium powder with grain diameter 5 $\mu$m and palladium-coated graphite powder with grain diameter 5 $\mu$m (i.e., flaky graphite powder with granules 4 $\mu$m in diameter coated with palladium 1 $\mu$m in thickness) in the weight ratio 1:1 can be used. For example, a capacitor can be produced using the electrically conductive coating material for cathode formation and the coating material for formation of the electrically conductive adhesive prepared as follows. That is, the aforementioned electrically conductive coating material for the formation of cathode is obtained by mixing the aforementioned electrically conductive powder (i.e., the powder mixture) with methyl methacrylate resin and xylene in the weight ratio 8:2:4, while the aforementioned coating material for the electrically conductive adhesive is prepared by mixing the aforementioned electrically conductive powder with bisphenol epoxy resin, a phenolic curing agent, imidazole and butyl cellosolve in the weight ratio of 80:12.1:7.9:0.1:20.

On the basis of the data shown in FIGS. 3 and 4, the palladium powder and palladium-coated graphite powder in the electrically conductive powder mixture used in the capacitor of the fifth embodiment should also have grain diameter in the range of 1 to 30 μm, and the form of the powder grains should also preferably be flaky.

The mixing ratio of the palladium and the palladium-coated graphite powders in the aforementioned mixture was varied as shown in FIG. 6. Then, by the same procedures as were used for the experiments performed in the first embodiment, coatings were formed from these mixtures and the electrical resistances of these coatings were measured. The coating materials used for the preparation of these coatings were obtained by mixing the aforementioned electrically conductive powder (i.e., powder mixture) with methyl methacrylate resin and xylene in the weight ratio of 8:2:4. The thickness of the coatings after drying was 200 μm. The grain diameter of the aforementioned palladium powder was 5 μm. The thickness of the palladium coating on the granules of the graphite powder was 1 μm. As the graphite nuclei of the coated powder, four varieties of graphite powder with grain diameter ranging from 0.1 to 50 μm were selected, and four kinds of electrically conductive coating materials are obtained. The electrical resistance was measured for each coating obtained from the above-mentioned coating materials. The results of these measurements are shown by curves $H_1-H_4$ in FIG. 6. The data in these curves show that the electrical resistance of the coating decreases as the grain size of the palladium-coated graphite powder increases. However, taking the surface characteristics of the coating into account, the grain diameter should desirably not exceed 50 μm. As regards the mixing ratio of the palladium and palladium-coated graphite powders, considering both the cost and the electrical resistance of the coatings so obtained, a weight ratio in the range of 9.5:0.5 to 2.5:7.5 is preferable.

Using a mixture of the aforementioned palladium powder and palladium-coated graphite powder in the weight ratio of 1:1 as the electrically conductive powder, the mixing ratio of this powder and the resin component were varied, coatings were prepared in each case. The electrical resistances of these coatings were measured by the same methods as were used in the experiments performed in the first embodiment. The results of the experiments are shown by curve H in FIG. 7. This curve shows that in the case of the aforementioned electrically conductive powder (the powder mixture), the weight ratios of this powder and methyl methacrylate which can appropriately be used for preparing the cathode material in the capacitor range from 9.5:0.5 to 5.0:5.0. When this type of powder mixture is used as the electrically conductive powder, the electrical resistance of the coatings so obtained is slightly lower than that of the coatings obtained by using the aforementioned mixture of palladium powder and uncoated graphite powder. Similar results were obtained when the electrically conductive adhesive (containing bisphenol epoxy resin, a phenolic curing agent, etc.) employed for the production of the capacitor of the aforementioned embodiment was used in place of the electrically conductive adhesive containing methyl methacrylate resin.

FIG. 5 shows that the appropriate thickness of the palladium layer of the palladium-coated graphite powder used in the fifth embodiment is 0.1-2 μm.

As mentioned above, the electrically conductive powder used in the fifth embodiment is a mixture of palladium powder and palladium-coated graphite powder. As compared with other metals, palladium possesses high electrical conductivity as well as being chemically stable and relatively insusceptible to ionization under conditions of high temperature and humidity. The graphite powder used as nucleus for the said palladium-coated graphite powder is also insusceptible to ionization under conditions of high temperature and humidity. Therefore, if the present mixed powder is used, then little migration occurs even under conditions of high temperature and humidity. Moreover, since palladium is comparatively inexpensive, the present type of capacitor can be economically produced.

As compared with the capacitors of the aforementioned first and second embodiments, the present type of capacitor displays a slightly larger initial value of tan δ, but this value does not greatly increase even if the capacitor is kept under conditions of high temperature and humidity. Moreover, the current leakage of the present type of capacitor is extremely low.

Next, tests were performed using the capacitors obtained in the aforementioned first to fifth embodiments as well as a conventional type of capacitor (with rated voltage 35 V and rated capacitance 6.8 μF in every case). The structure of the aforementioned conventional capacitor, as illustrated in FIG. 1, was identical with that employed in the present invention. However, both the cathode layer 6 and electrically conductive adhesive 9 are composed of a mixture of silver powder and methyl methacrylate resin. With respect to each of the aforementioned capacitors, the initial value of tan δ was measured and the number of electrical short circuits was counted, and the same observations were performed after the capacitors had been left for 1000 hours at 85° C. and relative humidity of 90%. The results of these tests are shown in Table 1.

TABLE 1

|  | Initial values | | Values after 1000 hours | |
| --- | --- | --- | --- | --- |
|  | tanδ[a] | Number of electrical short circuit[b] | tanδ[a] | Number of electrical short circuit[b] |
| Capacitors of this invention |  |  |  |  |
| First embodiment | 3.2% | 0/100 | 4.2% | 0/100 |
| Second embodiment | 3.0% | 0/100 | 4.0% | 0/100 |
| Third embodiment | 3.8% | 0/100 | 4.8% | 0/100 |
| Fourth | 4.6% | 0/100 | 5.6% | 0/100 |

TABLE 1-continued

| | Initial values | | Values after 1000 hours | |
|---|---|---|---|---|
| | tanδ[a] | Number of electrical short circuit[b] | tanδ[a] | Number of electrical short circuit[b] |
| embodiment | | | | |
| Fifth embodiment | 3.5% | 0/100 | 4.5% | 0/100 |
| Conventional capacitor | 3.2% | 0/100 | 4.5% | 35/100 |

[a]Values of tanδ were measured at frequency $f = 1$ kHz.
[b]The number of electrical short circuits observed among 100 capacitors is shown for each type. The presence of short circuits was observed after impressing the rated voltage for a period of 1 minute.

According to the present invention, the cathode layer and the electrically conductive adhesive can contain the same type of electrically conductive powder, or different types of electrically conductive powder. Combinations of the cathode layer and electrically conductive adhesive containing different types of electrically conductive powder include: (i) a cathode layer containing palladium powder and an electrically conductive adhesive containing palladium-coated nickel powder, (ii) a cathode layer containing palladium-coated graphite powder and an electrically conductive adhesive containing a mixture of palladium powder and graphite powder, and (iii) a cathode layer containing palladium-coated graphite powder and an electrically conductive adhesive containing palladium powder. Moreover, the following combinations can be employed: (iv) a cathode layer formed by flame spraying of solder or by electroplating of nickel and the type of electrically conductive adhesive of the present invention, (v) the type of cathode layer of the present invention and an electrically conductive adhesive containing carbon, nickel, etc., and (vi) the type of cathode layer of the present invention and a soldering connection in place of the electrically conductive adhesive. Still other feasible combinations are (vii) a silver cathode layer containing a silver powder susceptible to migration blended with a polymer and an electrically conductive adhesive of the present invention, and (viii) an adhesive containing silver powder susceptible to migration and a cathode layer of the present invention. However, when a cathode layer containing silver powder is combined with a type of electrically conductive adhesive of the present invention, electrical short circuits tend to occur if the capacitor so obtained is left under conditions of high temperature and humidity (for example, at 85° C. and relative humidity of 90% for 1000 hours).

As described above, the cathode layer and/or the electrically conductive adhesive that connects the cathode layer and the negative terminal in the solid electrolytic capacitor of the present invention contain palladium and a polymer. The palladium constituting the electrically conductive powder in the first embodiment possesses comparatively high electrical conductivity as compared with other metals, and moreover, is chemically stable and insusceptible to ionization under conditions of high temperature and humidity. Furthermore, since the specific gravity of palladium is relatively low, the speed of sedimentation of palladium granules when prepared in the form of a coating material is low, which is convenient in practical operations. In addition, palladium has the advantage of comparatively low cost among the precious metals (i. e., gold, platinum and palladium).

The following points should be taken into consideration when preparing the electrically conductive coating materials to be used for cathode layer or electrically conductive adhesive of the capacitor. Then, the specific resistance of the resulting coatings can be decreased, and moreover, capacitors can be obtained in which the value of tan δ are small and the electrical short circuits rarely occur even if the capacitors are placed under conditions of high temperature and humidity.

(a) The variety of polymer used should be appropriately selected in accordance with the intended application of the capacitor.

(b) The grain size of the electrically conductive powder should be as large as possible within the range consistent with acceptable processing characteristics.

(c) The form of the granules of the electrically conductive powder should be flaky so as to decrease contact resistance.

(d) The weight ratio of the electrically conductive powder and the polymer should be determined with consideration for the electrical conductivity of the said mixture and the strength of the coatings so obtained.

In the second embodiment of the present invention, a palladium-coated metal powder is used. The powder is obtained by forming a coating layer of palladium on the surface of each granule of an electrically conductive powder which is composed of a metal with higher electrical conductivity than that of palladium. The palladium coating layer serves to prevent chemical changes in the electrically conductive metallic particles which form the nuclei of the powder granules. Therefore, the initial value of tan δ for solid electrolytic capacitors employing this palladium-coated metallic powder is lower than the corresponding value for the previously described solid electrolytic capacitor of the first embodiment. Moreover, if a metal less expensive than palladium is employed for the nuclei of the electrically conductive powder, then capacitors can be produced more economically.

The palladium-coated graphite powder used in the third embodiment was formed by applying a layer of palladium to the surfaces of flaky granules of graphite powder, which has lower electrical conductivity than metals but is very inexpensive as well as being chemically stable and insusceptible to ionization under conditions of high temperature and humidity. Covering the graphite granules with palladium serves to decrease the contact resistance between the granules and thus reduce the specific resistance of coatings containing the said electrically conductive powder. In this case, the thicker the palladium coating layer is, the greater the reduction in the specific resistance of the resulting coating. Solid electrolytic capacitors produced by the use of palladium-coated graphite powder display a slightly higher initial value of tan δ than the capacitors of the first and second embodiment, but can be produced at lost cost.

In the fourth embodiment, a mixture of palladium powder and graphite powder was used as the electrically conductive powder. The presence of the palladium powder in the said mixture reduces the contact resistance between the graphite particles. If the following points are taken into consideration, then the specific resistance of the resulting coatings containing the electrically conductive powder can be decreased, and moreover, the capacitors can be produced efficiently.

(a) When coating materials are prepared from the electrically conductive powder, the grain size of the powder should be as large as possible within the range consistent with acceptable processing characteristics.

(b) The form of the granules of the powder should be flaky so as to decrease contact resistance.

(c) Subject to restrictions of cost, the proportion of palladium powder in the powder mixture should be as high as possible.

(d) The weight ratio of the electrically conductive powder relative to the polymer should be as large as possible within the range consistent with an acceptable level of mechanical strength for the coating.

A mixture of palladium powder and palladium-coated graphite powder is used in the fifth embodiment. The use of palladium-coated graphite powder in place of the uncoated graphite powder employed in the aforementioned fourth embodiment serves to reduce the specific resistance even further. Solid electrolytic capacitors employing the present type of mixed powder also display a somewhat large initial value of tan δ, but can be produced at low cost.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A solid electrolytic capacitor comprising an electrode provided with an anode lead; a dielectric oxide film, a solid electrolyte layer, a carbon layer, and a cathode layer, which are successively formed on the surface of said electrode; a positive terminal connected to said anode lead; and a negative terminal connected to said cathode layer by means of an electrically conductive adhesive; wherein at least one of said cathode layer and said electrically conductive adhesive comprises a polymer and an electrically conductive powder comprising a flaky palladium powder with grain diameters of 1–30 μm.

2. A solid electrolytic capacitor according to claim 1, wherein said polymer contained in said cathode layer is at least one selected from the group consisting of acrylic resins, polyethylene resins, vinyl resins, cellulose resins, polycarbonate resins, polyamide resins, epoxy resins, phenol resins and polyimide resins, and the weight ratio of said electrically conductive powder and said polymer is in the range of 9.5:0.5 to 6.0:4.0.

3. A solid electrolytic capacitor according to claim 1, wherein said polymer contained in said adhesive is at least one thermosetting resin selected from the group consisting of epoxy resins, phenol resins and polyimide resins, and the weight ratio of said electrically 4. A solid electrolytic capacitor according to claim 1, wherein said electrically conductive powder is a mixture of said palladium powder and a graphite powder.

5. A solid electrolytic capacitor according to claim 4, wherein said graphite powder is a flaky graphite powder with grain diameter of 5–100 μm; the weight ratio of said palladium powder and said graphite powder is in the range of 9.5:0.5 to 2.5:7.5; and the weight ratio of said electrically conductive powder and said polymer is in the range of 9.5:0.5 to 5.0:5.0.

6. A solid electrolytic capacitor according to claim 1, wherein said electrically conductive powder is a mixture of said palladium powder and a palladium-coated graphite powder obtained by forming a coating layer of palladium on the surface of each granule of graphite powder.

7. A solid electrolytic capacitor according to claim 6, wherein said palladium-coated graphite powder is obtained by forming a coating layer of palladium 0.1–2 μm in thickness on the surface of each granule of flaky graphite powder with grain diameter of 1–50 μm; the weight ratio of said palladium powder and palladium-coated graphite powder is in the range of 9.5:0.5 to 2.5:7.5, and the weight ratio of the electrically conductive powder and said polymer is in the range of 9.5:0.5 to 5.0:5.0.

8. A solid electrolytic capacitor comprising an electrode provided with an anode lead; a dielectric oxide film, a solid electrolyte layer, a carbon layer, and a cathode layer, which are successively formed on the surface of said electrode; a positive terminal connected to said anode lead; and a negative terminal connected to said cathode layer by means of an electrically conductive adhesive; wherein at least one of said cathode layer, and said electrically conductive adhesive comprises a polymer and an electrically conductive powder comprising, a palladium-coated metal powder obtained by forming a coating layer of palladium 0.1–2 μm in thickness on the surface of each granule of an electrically conductive flaky powder which comprises a metal with higher electrical conductivity than that of palladium, said granule having a diameter of 1–50 μm.

9. A solid electrolytic capacitor according to claim 8, wherein said polymer contained in said cathode layer is at least one selected from the group consisting of acrylic resins, polyethylene resins, vinyl resins, cellulose resins, polycarbonate resins, polyamide resins, epoxy resins, phenol resins and polyimide resins, and the weight ratio of said electrically conductive powder and said polymer is in the range of 9.5:0.5 to 6.0:4.0.

10. A solid electrolytic capacitor according to claim 8, wherein said polymer contained in said adhesive is at least one thermosetting resin selected from the group consisting of epoxy resins, phenol resins and polyimide resins, and the weight ratio of said electrically conductive powder and said polymer is in the range of 9.5:0.5 to 6.0:4.0.

11. A solid electrolytic capacitor comprising an electrode provided with an anode lead; a dielectric oxide film, a solid electrolyte layer, a carbon layer, and a cathode layer, which are successively formed on the surface of said electrode; a positive terminal connected to said anode lead; and a negative terminal connected to said cathode layer by means of an electrically conductive adhesive; wherein at least one of said cathode layer and said electrically conductive adhesive comprises a polymer and an electrically conductive powder comprising, a palladium-coated graphite powder obtained by forming a coating layer of palladium 0.1–0.2 μm in thickness on the surface of each granule of flaky graphite powder with grain diameters of 1–50 μm.

12. A solid electrolytic capacitor according to claim 11, wherein said polymer contained in said cathode layer is at least one selected from the group consisting of acrylic resins, polyethylene resins, vinyl resins, cellulose resins, polycarbonate resins, polyamide resins, epoxy resins, phenol resins and polyimide resins, and the weight ratio of said electrically conductive powder and said polymer is in the range of 9.5:0.5 to 6.0:4.0.

13. A solid electrolytic capacitor according to claim 11, wherein said polymer contained in said adhesive is at least one thermosetting resin selected from the group consisting of epoxy resins, phenol resins and polyimide resins, and the weight ratio of said electrically conductive powder and said polymer is in the range of 9.5:0.5 to 6.0:4.0.

* * * * *